Jan. 9, 1934.   J. A. WEILAND   1,943,197
STUFFING DEVICE
Filed July 15, 1932
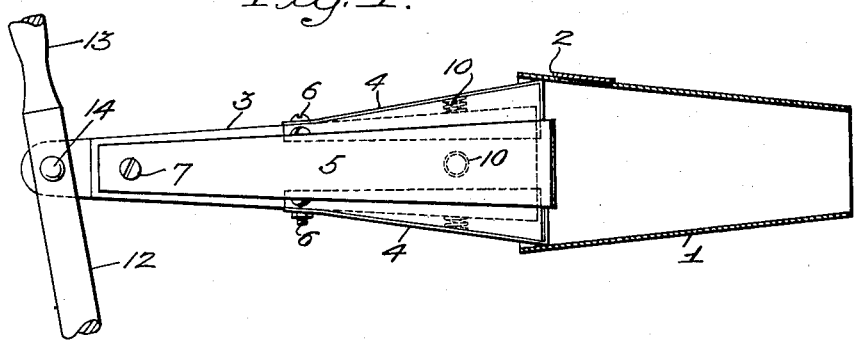
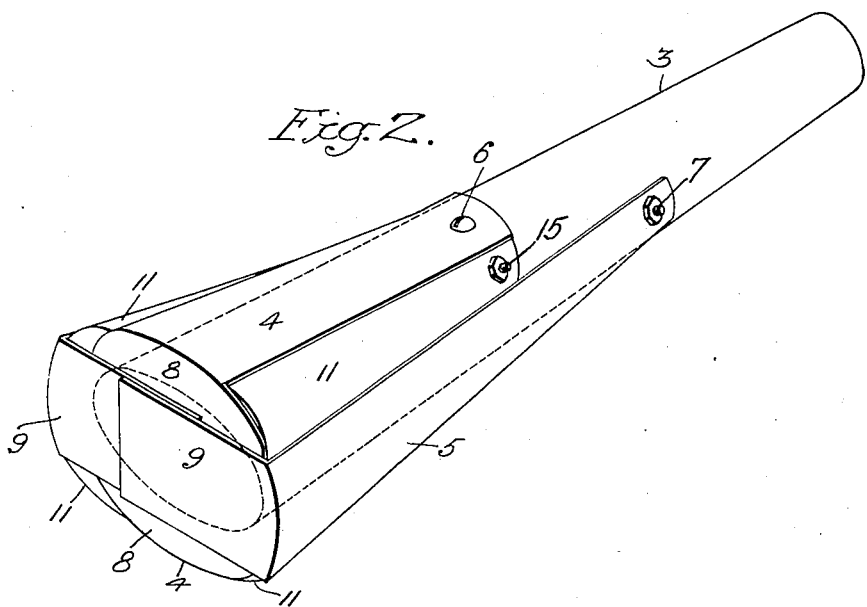
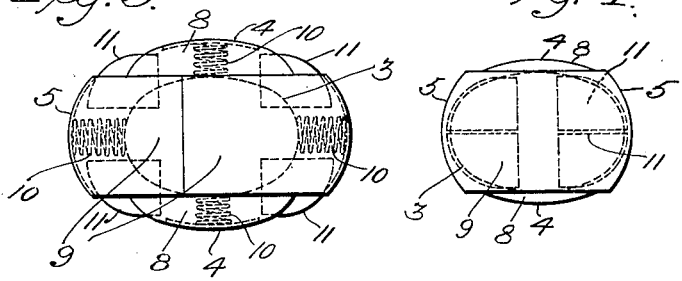
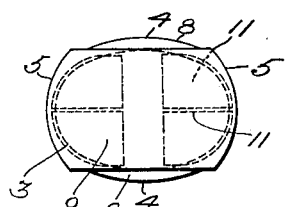
Inventor:
John Alvin Weiland
by his Attorneys
Howson & Howson Patented Jan. 9, 1934

1,943,197

UNITED STATES PATENT OFFICE 1,943,197

STUFFING DEVICE

John Alvin Weiland, Phoenixville, Pa., assignor to Weiland Packing Company, Inc., Phoenixville, Pa., a corporation of Pennsylvania Application July 15, 1932. Serial No. 622,751

9 Claims. (Cl. 17—38)

This invention relates to new and useful improvements in packing apparatus and more particularly to apparatus of a character for use in the manufacture of bologna and sausage and the like, wherein edible products are stuffed internally of thin casings.

The principal object of the invention is to provide a device of the character set forth comprising a piston operative in conjunction with a stuffing cone for extruding products therefrom into casings embracing one end of said cone.

A more specific object of the invention is to provide a piston of the character noted, comprising a number of radially movable arms each compressible against the action of a spring to afford a working face for the piston, the area of which is self-adjusting with respect to the changes in area of the cone as the piston moves longitudinally therethrough to extrude products from one end thereof.

Other features and details of construction of the invention will be set forth hereinafter and be shown in the accompanying drawing in which:

Figure 1 is a side elevation view partly in section showing the apparatus constituting the present invention;

Fig. 2 is a view in perspective of the piston;

Fig. 3 is a front end elevation of the head of the piston disclosed in Fig. 2; and Fig. 4 is a view similar to that disclosed in Fig. 3, showing the piston head in its contacted state.

In the manufacture of packers' products, such as bologna, sausages, or other articles which are generally packed in casings composed primarily of animal tissue and, of late, manufactured from an artificial material of cellular composition, the meat or other product is forced into said casings in most instances by a process of extrusion from a substantially conical stuffing vat or cylinder, the casing to receive the product embracing or being stretched over the smaller end of the stuffing cone.

Heretofore, in packing of the above character, the extrusion of products outwardly of the small end of a cone into a relatively thin casing, has been accomplished by manual operation of a plunger having an effective working head of fixed dimensions. This method gave rise to certain difficulties and resulted very often in the rupturing of the casing, as well as necessarily discarding a large quantity of the product through waste. A plunger having a fixed working head of substantially the dimensions of the large end of the stuffing cone, is unable to pass inwardly thereof and extrude the product from the smaller end of the cone, and similarly the use of a plunger having a fixed diameter small enough to permit entrance of the plunger a substantial distance through the cone, did not extrude that portion of the product which resided in said cone in a position beyond the periphery of the face of the smaller plunger. The product thus remaining in the stuffing cone must be discarded at the end of a working day as waste, and obviously when a great number of similar devices are used in the manufacture of cased products, the discard or waste in a single day may assume an economic factor which cannot be lightly acknowledged.

By the present invention, a piston for the extrusion of products from a conical reservoir is provided, which eliminates the above undesirable features attendant upon the packing of such products in casings of a thin rupturable character.

Referring now more particularly to the drawing, reference numeral 1 designates a stuffing cone, which is of a type lately used with increasing extent in the packing of meat products and the like, the said cone having a trap 2 in the upper side thereof to permit the products to be inserted therein. A casing (not shown), composed of animal tissue or artificial cellular material, is stretched about or embraces the smaller end of the cone and the piston, constituting the present invention reciprocates longitudinally within said cone from the larger end thereof to force the product from said cone inwardly of the casing.

In the present instance the piston comprises a body portion 3 having expansible arms 4—4 and 5—5 respectively, the said arms each being secured at one end to the body 3 of the plunger as at 6 and 7 respectively, the other ends thereof being formed substantially normal to the arms 4—4 and 5—5 as at 8—8 and 9—9 respectively and constitute the compression or working face of the piston.

Each of the arms 4—4 and 5—5 operates against the action of a spring 10 which normally tends to maintain said arms in fully expanded position with respect to the body 3 of the piston as shown in Figs. 1 and 3 of the drawing, and in contact with the inner surface of the stuffing cone 1, the actual degree of expansion depending upon the position of the piston longitudinally within the cone. A number of complementary arms 11 similar to the arms 4—4 and 5—5 previously described, are secured by means 15 intermediate each adjacent arm of the latter mentioned groups and afford a working surface for the piston in the space normally residing between the main arms thereof.

By the novel construction of the present invention, a piston is provided which is capable of assuming an effective working face, the dimensions of which are self-adjusting to conform to the inner dimensions of the stuffing cone 1 at any position during the longitudinal travel thereof from the larger end of said cone to the smaller end, permitting the entire quantity of meat or other substance, to be forced through the cone by the piston and extruded from the smaller end thereof without waste of any part of the product. Similarly the present construction of the piston precludes binding of the edges of the face of said piston against the inner surface of the cone, and permits the exertion of a continuous even pressure on the product which functions to eliminate the tendency of the casings becoming ruptured or broken.

The relative size of the compression face of the piston, when in the fully expanded position is shown in Fig. 3, and in Fig. 4 the piston is disclosed in the compressed position. It should be noted when the plunger has been advanced longitudinally into the cone toward the smaller end thereof resulting in compression of the arms 4—4 and 5—5 against the springs 10, that during the return stroke of the piston the said springs act to expand the arms gradually until the piston is adjacent the larger end of the cone, when the arms assume their fully expanded position.

In general practice it has been found advisable to actuate the plunger in its longitudinal movement with respect to the cone 1 by means of a lever 12 having a handle 13 which may be pivoted at its lower end and is pivotally connected to the piston body 3 at the rearward extremity thereof as at 14 in Fig. 1 of the drawing.

While the particular embodiment of the present invention has been disclosed for the purpose of description, it is not intended that the device be limited to the exact form and structure shown, but may be of such form and structure as is within the scope of the appended claims.

What is claimed is:

1. An apparatus for stuffing material into a casing comprising a cone section to receive said material, a piston reciprocable in said cone, and a sectional pressure head on said piston, each of said sections being movable radially of the piston and having at least a portion of their radial edges overlapping whereby a relative traverse of said sections is effected to conform to changes in cross section area of the cone as the piston moves therethrough and a substantially solid pressure head surface is afforded irrespective of the position of said sections radially of the piston.

2. An apparatus for stuffing material into a casing comprising a cone section to receive said material, a piston reciprocable in said cone, a sectional pressure head on said piston, each of said sections being movable radially of the piston and having at least a portion of their radial edges overlapping whereby a relative traverse of said sections is effected to conform to changes in cross section area of the cone as the piston moves therethrough and a substantially solid pressure head surface is afforded irrespective of the position of said sections radially of the piston, and resilient means associated with each of said sections tending to maintain the latter in expanded relation with respect to the piston.

3. In apparatus for stuffing material into a casing comprising a conical section to receive the material, a piston reciprocable in said conical section to extrude said material outwardly thereof, said piston including a piston rod, and a number of diverging arms secured thereto, at least a part of which are in overlapping relation normal to the axis of said rod beyond the inner end thereof constituting a pressure head, said arms being movable radially of the piston rod to effect a relative traverse of said overlapping portions whereby the area of the pressure head is self-adjusting to conform to the changes in cross section area of the conical section as the piston moves longitudinally therethrough.

4. In apparatus for stuffing material into a casing comprising a conical section to receive the material, a piston reciprocable in said conical section to extrude said material outwardly thereof, said piston including a piston rod, a number of diverging arms secured thereto, at least part of which are in overlapping relation normal to the axis of said rod beyond the inner end thereof constituting a pressure head, said arms being movable radially of the piston rod to effect a relative traverse of said overlapping portions whereby the area of the pressure head is self-adjusting to conform to the changes in cross section area of the conical section as the piston moves longitudinally therethrough and resilient means associated with each of said sections tending to maintain the latter in expanded relation with respect to the piston.

5. In an apparatus for stuffing material into a casing comprising a cone arranged to receive said material, a piston reciprocable in said cone, said piston including a longitudinally movable piston rod, and a plurality of diverging arms secured to said rod, the opposite ends thereof being disposed normal to the axis of the rod in overlapping relation beyond the inner end thereof and constituting a pressure head, said arms being movable radially of said rod effecting a relative traverse of the overlapping portions of the arms whereby the area of the pressure head is self-adjusting to the cross section area of the cone as the piston moves longitudinally therethrough.

6. In an apparatus for stuffing material into a casing comprising a cone arranged to receive said material, a piston reciprocable in said cone, said piston including a longitudinally movable piston rod, a plurality of diverging arms secured to said rod, the opposite ends thereof being disposed normal to the axis of the rod in overlapping relation beyond the inner end thereof and constituting a pressure head, said arms being movable radially of said rod effecting a relative traverse of the overlapping portions of the arms whereby the area of the pressure head is self-adjusting to the cross section area of the cone as the piston moves longitudinally therethrough, and resilient means associated with each of said sections tending to maintain the latter in expanded relation with respect to the piston.

7. In apparatus for stuffing material into a casing comprising a conical section to receive the material, a piston reciprocable in said conical section to extrude said material outwardly thereof, said piston including a piston rod, and a number of diverging arms secured thereto, at least a part of which overlie the inner end of the piston rod normal to the axis thereof and constituting a pressure head, said arms being movable radially of the piston rod to effect a relative traverse of said portions whereby the area of the pressure head is self-adjusting to conform to the changes in cross section area of the conical section as the piston moves longitudinally therethrough.

8. In apparatus for stuffing material into a casing comprising a conical section to receive the material, a piston reciprocable in said conical section to extrude said material outwardly thereof, said piston including a piston rod, and a number of diverging arms secured thereto, at least a part of which are in overlapping relation and constitute a pressure head, said arms being movable radially of the piston rod to effect a relative traverse of said overlapping portions whereby the area of the pressure head is self-adjusting to conform to the changes in cross section area of the conical section as the piston moves longitudinally therethrough.

9. In an apparatus for stuffing material into a casing comprising a cone arranged to receive said material, a piston reciprocable in said cone, said piston including a longitudinally movable piston rod, and a plurality of diverging arms secured to said rod, the opposite ends thereof being disposed normal to the axis of the rod in overlapping relation and constitute a pressure head, said arms being movable radially of said rod effecting a relative traverse of the overlapping portions of the arms whereby the area of the pressure head is self-adjusting to the cross section area of the cone as the piston moves longitudinally therethrough.

JOHN ALVIN WEILAND.